Patented Nov. 7, 1939

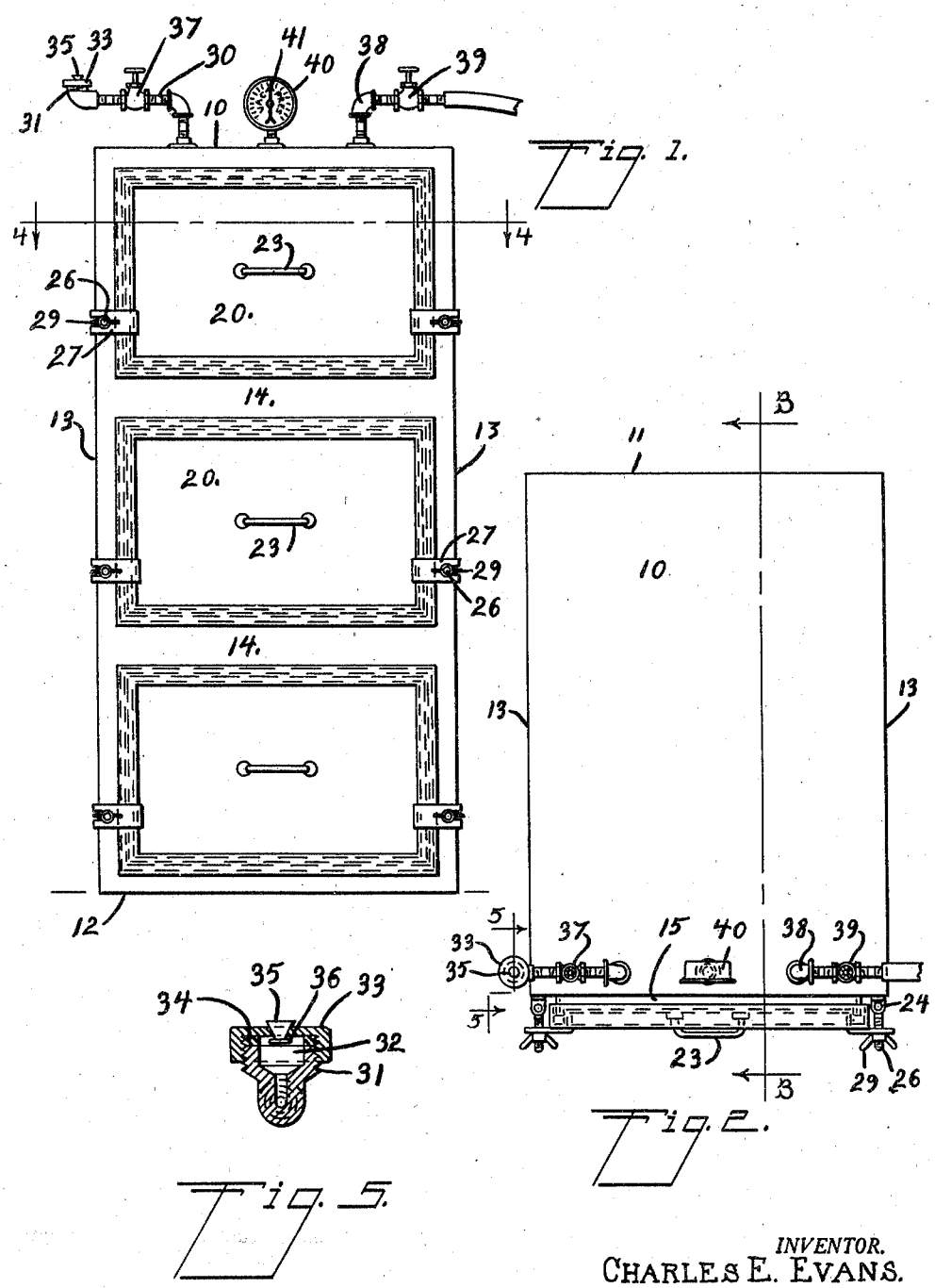

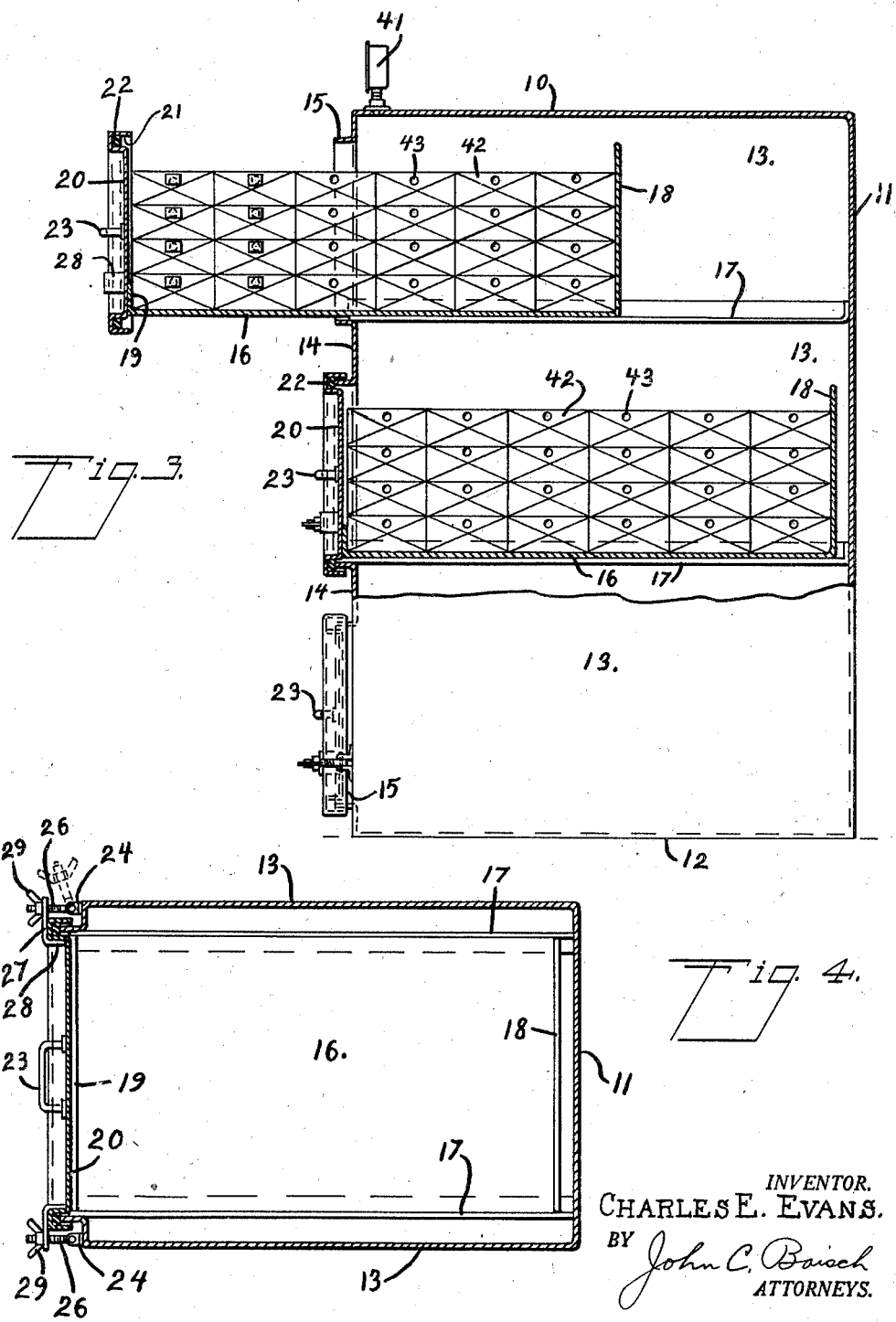

2,179,327

UNITED STATES PATENT OFFICE 2,179,327

MEANS FOR TREATING FOODSTUFFS

Charles E. Evans, Council Bluffs, Iowa, assignor of one-half to L. G. Howard, Council Bluffs, Iowa Application May 20, 1938, Serial No. 209,012

2 Claims. (Cl. 99—269)

This invention relates generally to methods and means for treating foodstuffs to preserve same and to retain same in a preserved condition.

Eggs in the shell are a typical example of such foodstuffs that may be treated and preserved and throughout the specification reference to the treatment and preservation of eggs, is not intended to limit the scope of the invention to such food as numerous other foods and food products may be similarly treated and preserved.

It has been found that foodstuffs, such as eggs and the like, that are subjected to a vacuum for a suitable period of time lose a substantial portion of the air contained therein and when a preserving gas is substituted in the foodstuffs for the air normally contained therein same will be preserved for a relatively long period of time, with or without refrigeration, as long as said gas is retained in said foodstuffs.

In carrying out my invention eggs, or the like, are first packed in suitable containers or cartons which hold a convenient number of same, viz, a dozen. The cartons are sealed tightly except for a small opening and are placed in a cabinet which is closed and sealed. Air is exhausted from the cabinet and simultaneously the air in the cartons is exhausted therefrom through the openings in same. The vacuum is maintained for a suitable period of time until air in the eggs is drawn therefrom through the shells which are relatively porous. A preserving gas, such as carbon dioxide, is then introduced into the cabinet and the pressure of said gas raised above atmospheric pressure. The gas enters the cartons through the openings therein and then enters the eggs through the shells thereof. The pressure in the cabinet is then brought back to normal atmospheric pressure and the cabinet opened. The cartons are then removed and the openings therein hermetically sealed immediately to prevent appreciable loss of gas therefrom. Little gas will be lost from the cartons between the time of the opening of the cabinet and the sealing of said cartons as the carbon dioxide gas is of substantially the same weight as air and consequently substantially inert. The cartons are now ready for storage or for sale and are of such size as to be convenient to handle and attractive to the buying public.

It is therefore an important object of my invention to provide methods and means for treating, preserving and handling foodstuffs.

It is another object of my invention to provide means wherein food, packed in cartons, can be subjected to a vacuum to remove air therefrom and whereby a preserving gas may be forced into same as a substitute for the removed air.

Another object of the invention is to provide suitable cartons or containers for food which can be sealed, after treatment, to retain the preserving gas in the food.

Another object is to provide a carton of this character wherein the food may be sold to the consuming public.

Numerous other objects and advantages of the invention will be apparent as it is better understood from the following detailed description, which, taken in connection with the accompanying drawings, discloses a preferred embodiment thereof.

Referring to the drawings:

Figure 1 is a front elevation of the treating cabinet.

Figure 2 is a plan view of the same.

Figure 3 is a vertical, broken section through the cabinet taken on line 3—3 of Figure 2.

Figure 4 is a horizontal section through the cabinet taken on line 4—4 of Figure 1.

Figure 5 is an enlarged section through the exhaust valve of the cabinet taken on line 5—5 of Figure 2.

Referring more particularly to the drawings, which illustrate a preferred embodiment of my invention, the cabinet is provided with a top 10, back 11, bottom 12, and sides 13. The front wall 14 of the cabinet is provided with openings with out-turned flanges 15 thereabout. Each opening is provided with a sliding drawer having a bottom 16 which slides on tracks 17 within the cabinet, said tracks being suitably secured to the respective sides of said cabinet by welding or otherwise. Each drawer is provided, adjacent the rear end thereof, with an upstanding end piece 18. The bottom 16 of the drawers has a short upturned flange 19 adjacent the forward ends thereof. A front plate 20 is suitably secured to the upturned flanges 19 of each drawer, and said front piece 20 is so formed as to provide a marginal channel 21 thereabout within which is received a gasket 22. The channels 21 are adapted to receive the respective flanges 15 therein. The free edges of said flanges 15 sealably contact the gaskets 22 when the drawer is shoved into the cabinet. Each drawer is provided with a handle 23 for opening same and each drawer is adapted to be sealably secured when in a closed position by clamps which include brackets 24 secured to the front 14 of the cabinet adjacent the side edges thereof. A pivoted screw 26 is operably secured to each bracket 24. A clamp member 27 is provided for each clamp and has a slot in one end within which is received the respective screw 26. Each clamp member 27 is provided with an inturned flange 28 which engages the face of the front plate 20 of the respective drawers. A winged nut 29 is provided for each screw 26 for tightening the clamps. It should be noted that a clamp is provided for each side of each drawer.

A conduit 30 is provided which communicates with the interior of the cabinet. A valve, for exhaustion of air from the cabinet is provided, adjacent the end of conduit 30, and comprises a stem portion 31 having a relatively large bore 32 in the end thereof. The exterior of the stem 31 is threaded and a cap 33 is screwed on said stem. A gasket 34 is provided between the cap and the end of the stem to form a seal therebetween. The cap is provided with a central opening which tapers inwardly from the top and operably receives therein a tapering stopper 35. The stopper 35 is larger at its outer end than the opening and smaller at its inner end than said opening. The inner end of the stopper is provided with laterally extending arms 36 which are adapted to engage the inner side of the cap to limit outward movement of said stopper. The conduit 30 is provided with a valve 37 which may be closed, after air has been exhausted from the cabinet. An intake conduit 38 is provided and communicates with the interior thereof; said conduit also being provided with a valve indicated at 39. A gauge 40 is operably secured to the top of the cabinet and communicates with the interior thereof, said gauge being adapted to indicate the amount of vacuum within the cabinet when the indicator 41 moves toward the side of the dial marked "Vac". The amount of gas pressure in the cabinet, above atmospheric pressure is indicated when the indicator 41 moves toward the side of the dial marked "Pres".

The eggs, or other food, are packed in suitable cartons or containers 42 which may be of heavy paper or the like. The containers are hermetically sealed except for an opening 43 in one end. The packed cartons are then placed in the drawers of the cabinet with the openings 43 at the sides of the drawers, as shown in Figure 3. The openings must be uncovered so that air and gas may freely pass therethrough. The drawers are then moved to the closed positions and clamped tightly to prevent air entering or carbon dioxide gas escaping from the cabinet. With valve 39 closed and valve 37 open air is exhausted from the cabinet through the exhaust valve and when a sufficient amount of air has been exhausted valve 37 is closed. Evacuation of the cabinet causes air in the containers 42 to be drawn therefrom through openings 43 and air in the eggs to be drawn from same through the pores of the shells.

The eggs are allowed to remain in the vacuum for a short period of time until a substantial portion of the air in said eggs has been drawn therefrom. Valve 39 is then opened to admit carbon dioxide or other preserving gas into the cabinet through conduit 38 which is connected with a tank, not shown, containing a supply of said gas.

The gas pressure in the cabinet is raised to above atmospheric pressure and the eggs are subjected to said gas under pressure for a suitable period of time to allow the gas, which enters the containers through openings 43, to be forced through the shells of said eggs until same replaces the normal air content of the eggs. During this last step of the process valves 37 and 39 may both be closed.

The pressure in the cabinet then is released by opening valve 37 to equalize the pressure within and without the cabinet. The clamps are released and the drawers pulled out as shown in Figure 3. A suitable seal of gummed paper or the like is immediately placed over the holes 43 of the cartons to prevent loss of gas therefrom and the eggs may then be stored, with or without refrigeration, or sold to the consuming public in the cartons 42 and same will remain in a fresh preserved state for relatively long periods of time.

As the carbon dioxide gas is substantially the same weight as air it is relatively inert and no appreciable amount is lost from the cartons between the opening of the cabinet and the sealing of the openings 43.

It is thought that the invention and many of its attendant advantages will be understood from the foregoing description, and it will be apparent that various changes may be made in the form, construction, arrangement of the parts and steps of the process without departing from the spirit and scope of the invention or sacrificing all of its material advantages, the form hereinbefore described being merely a preferred embodiment thereof.

Having thus described my invention what I claim is:

1. In a device of the class described, the combination of a cabinet forming an enclosure and having openings in one side, outwardly extending flanges about each opening, a drawer for each opening, each drawer having a bottom, an upturned back and a front plate, said front plate having a marginal channel adapted to receive the flange of the respective opening therein, a gasket in said channel adapted for sealable engagement with the flange when the drawer is closed, guide means for each drawer secured in the cabinet on which said drawers are adapted to slide, means for securing each drawer in the closed position, an exhaust conduit for the cabinet for exhausting air therefrom, a vacuum valve for the exhaust conduit, a closable valve for said exhaust conduit interposed between the vacuum valve and the cabinet, an intake conduit for the cabinet adapted to admit a preserving gas therein, a closable valve interposed in said intake conduit, a gauge operably connected with the cabinet and adapted to show the amount of vacuum and the pressure of gas respectively in said cabinet, and sealable containers for foodstuffs to be preserviced, said containers being adapted to be packed in the drawers during treatment of the foodstuffs therein.

2. In a device of the class described, the combination of a cabinet having openings therein, outwardly extending flanges about each opening, a drawer for each opening, each drawer having a bottom, an upturned back and a front plate, said front plate having a continuous channel therein adapted to receive the respective flange therefor a gasket in said channel, means for securing each drawer in the closed position, guide means for each drawer on which same operably slide, an exhaust conduit for the cabinet, a vacuum valve for said exhaust conduit, a closable valve interposed in said conduit between said vacuum valve and the cabinet, an intake conduit, a valve interposed in said intake conduit, and a gauge operably connected with the cabinet and adapted to show the amount of vacuum and the pressure of gas respectively in said cabinet.

CHARLES E. EVANS.